(12) United States Patent
Yoo et al.

(10) Patent No.: US 12,675,688 B2

(45) Date of Patent: Jul. 7, 2026

(54) ENERGY-EFFICIENT RETRAINING METHOD OF GENERATIVE NEURAL NETWORK FOR DOMAIN-SPECIFIC OPTIMIZATION

(71) Applicant: Korea Advanced Institute of Science and Technology, Daejeon (KR)

(72) Inventors: Hoi Jun Yoo, Daejeon (KR); So Yeon Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 1156 days.

(21) Appl. No.: 17/574,501

(22) Filed: Jan. 12, 2022

(65) Prior Publication Data

US 2023/0098672 A1 Mar. 30, 2023

(30) Foreign Application Priority Data

Sep. 24, 2021 (KR) .......................... 10-2021-0126696

(51) Int. Cl.
| | |
|---|---|
| *G06N 3/08* | (2023.01) |
| *G06V 10/776* | (2022.01) |
| *G06V 10/82* | (2022.01) |

(52) U.S. Cl.
CPC ............. *G06N 3/08* (2013.01); *G06V 10/776* (2022.01); *G06V 10/82* (2022.01)

(58) Field of Classification Search
CPC ......... G06N 3/08; G06V 10/82; G06V 10/776
See application file for complete search history.

(56) References Cited

U.S. PATENT DOCUMENTS

| | | | | |
|---|---|---|---|---|
| 2019/0188554 | A1 | 6/2019 | Ma et al. | |
| 2020/0272899 | A1* | 8/2020 | Dunne | ................... G06N 3/098 |
| 2020/0327884 | A1* | 10/2020 | Bui | ......................... G10L 15/16 |
| 2022/0383031 | A1* | 12/2022 | Chen | ....................... G06F 16/56 |
| 2022/0405605 | A1* | 12/2022 | Yokoyama | ................ G06T 7/00 |

FOREIGN PATENT DOCUMENTS

| | | |
|---|---|---|
| KR | 10-2019-0100320 A | 8/2019 |
| KR | 10-2019-0119548 A | 10/2019 |
| KR | 10-2139729 B1 | 7/2020 |
| KR | 10-2157441 B1 | 9/2020 |

* cited by examiner

*Primary Examiner* — Sherrod L Keaton

(74) *Attorney, Agent, or Firm* — Revolution IP, PLLC

(57) ABSTRACT

Disclosed is an energy-efficient retraining method of a generative neural network for domain-specific optimization, including (a) retraining, by a mobile device, a pretrained generative neural network model with respect to some data of a new user dataset, (b) comparing, by the mobile device, the pretrained generative neural network model and a generative neural network model retrained for each layer with each other in terms of a relative change rate of weights, (c) selecting, by the mobile device, specific layers having high relative change rate of weights, among layers of the pretrained generative neural network model, as layers to be retrained, and (d) performing, by the mobile device, weight update for only the layers selected in step (c), wherein only some of all layers are selected and trained in a retraining process that requires a large amount of operation, whereby rapid retraining is performed in the mobile device.

4 Claims, 8 Drawing Sheets

FIG. 1

[FIG. 2]
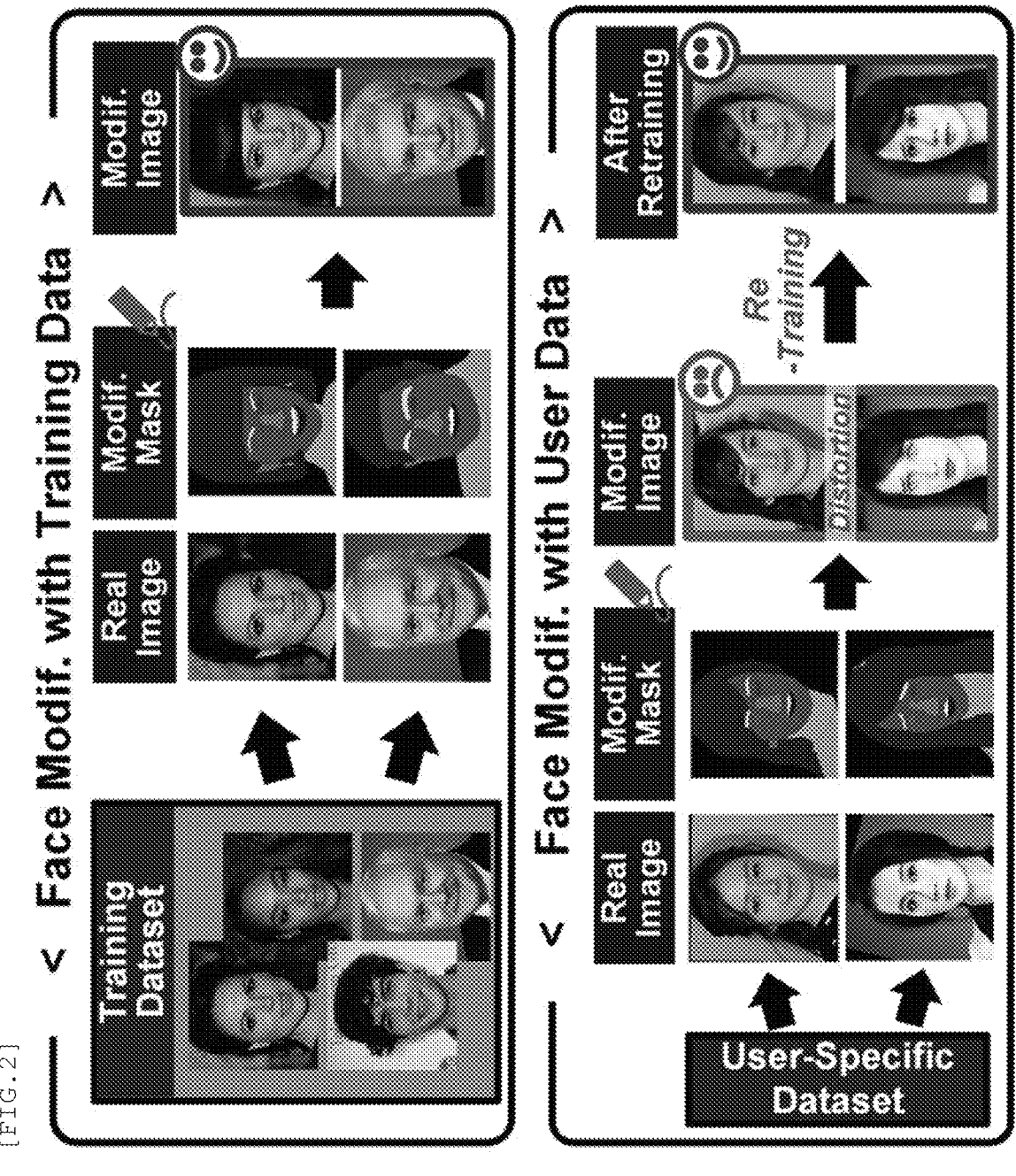

[FIG.3]
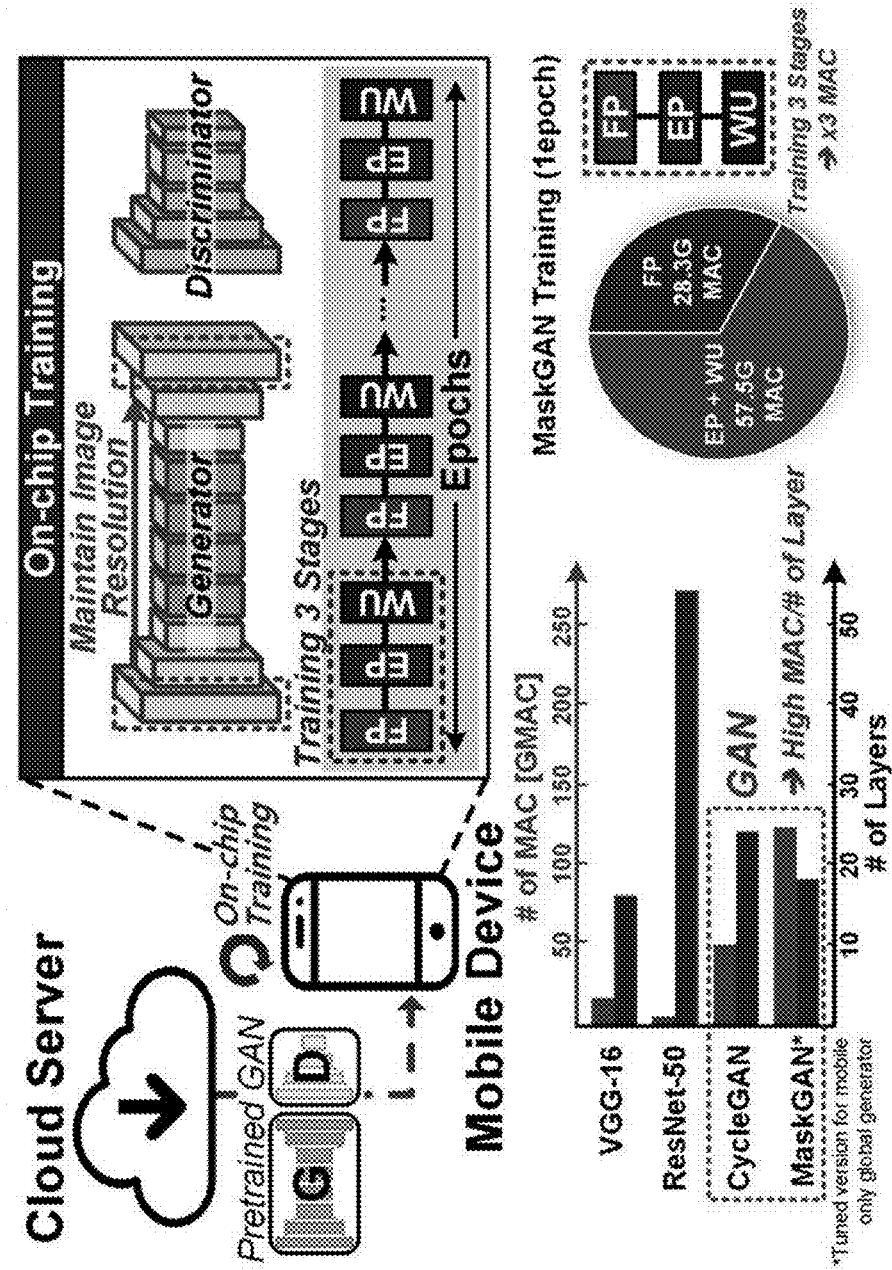

[FIG. 4]
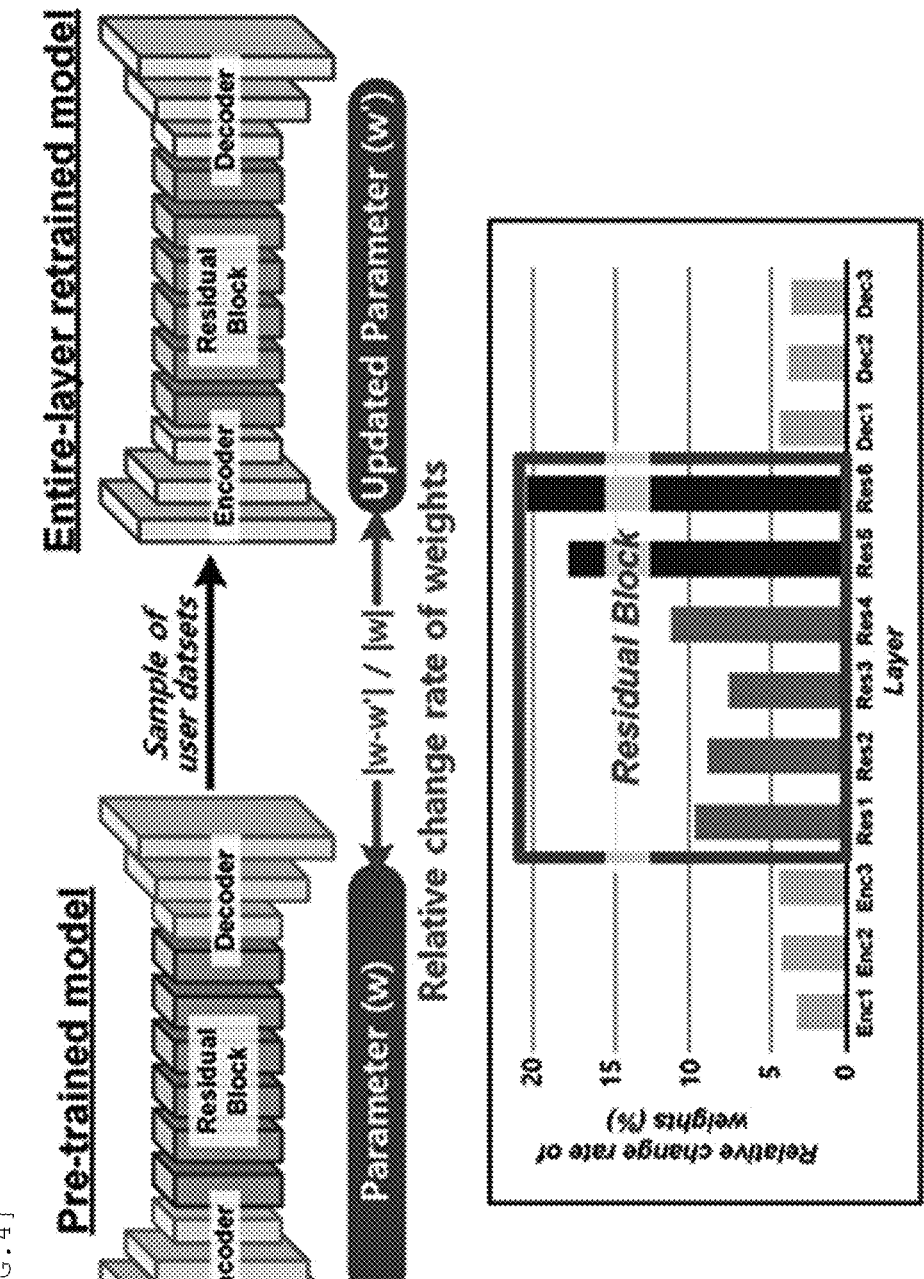

[FIG.5]

[FIG.6]
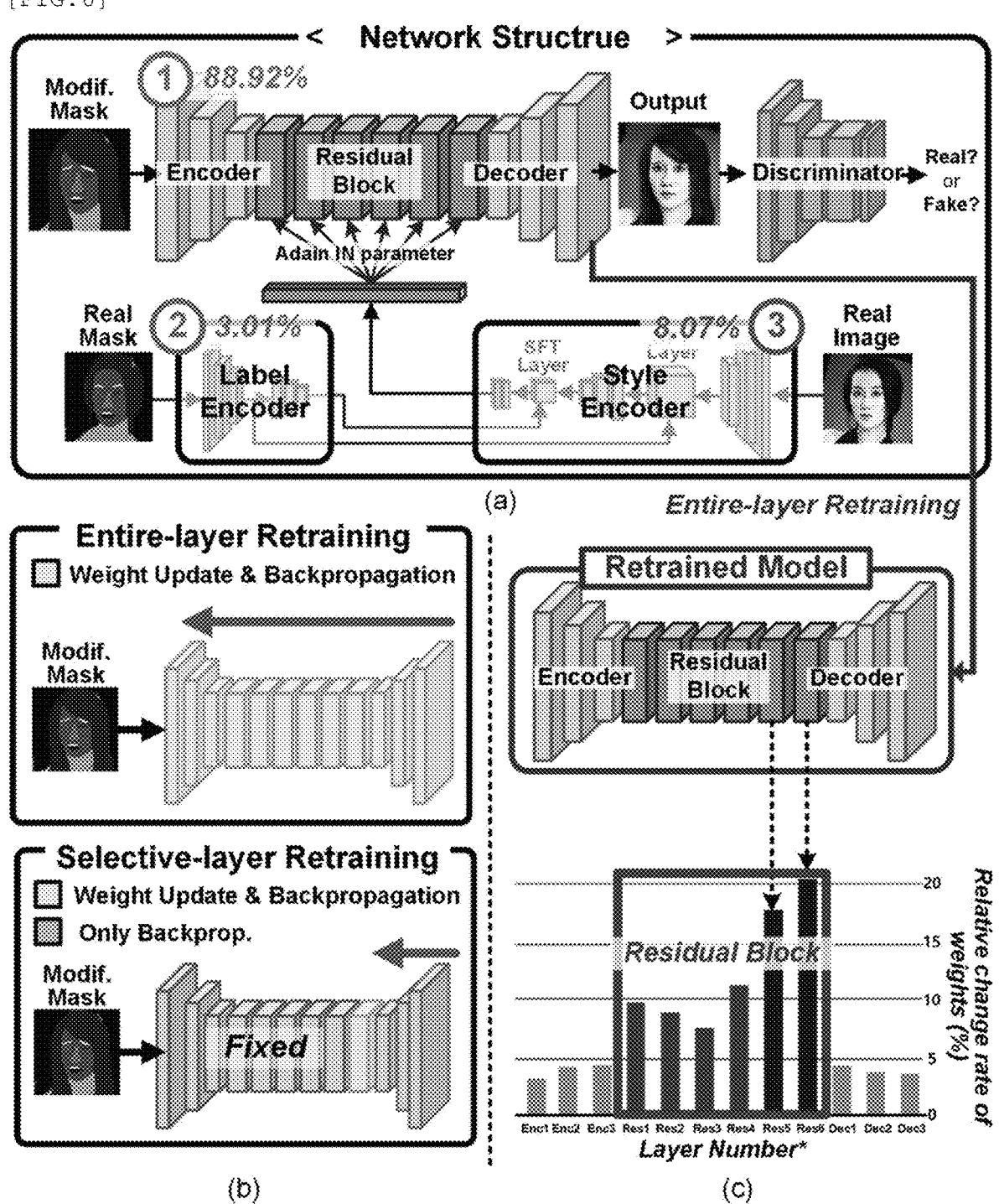
(a)
(b)                                              (c)
* Enc : Encoder / Res : Residual Block / Dec : Decoder

[FIG.7]
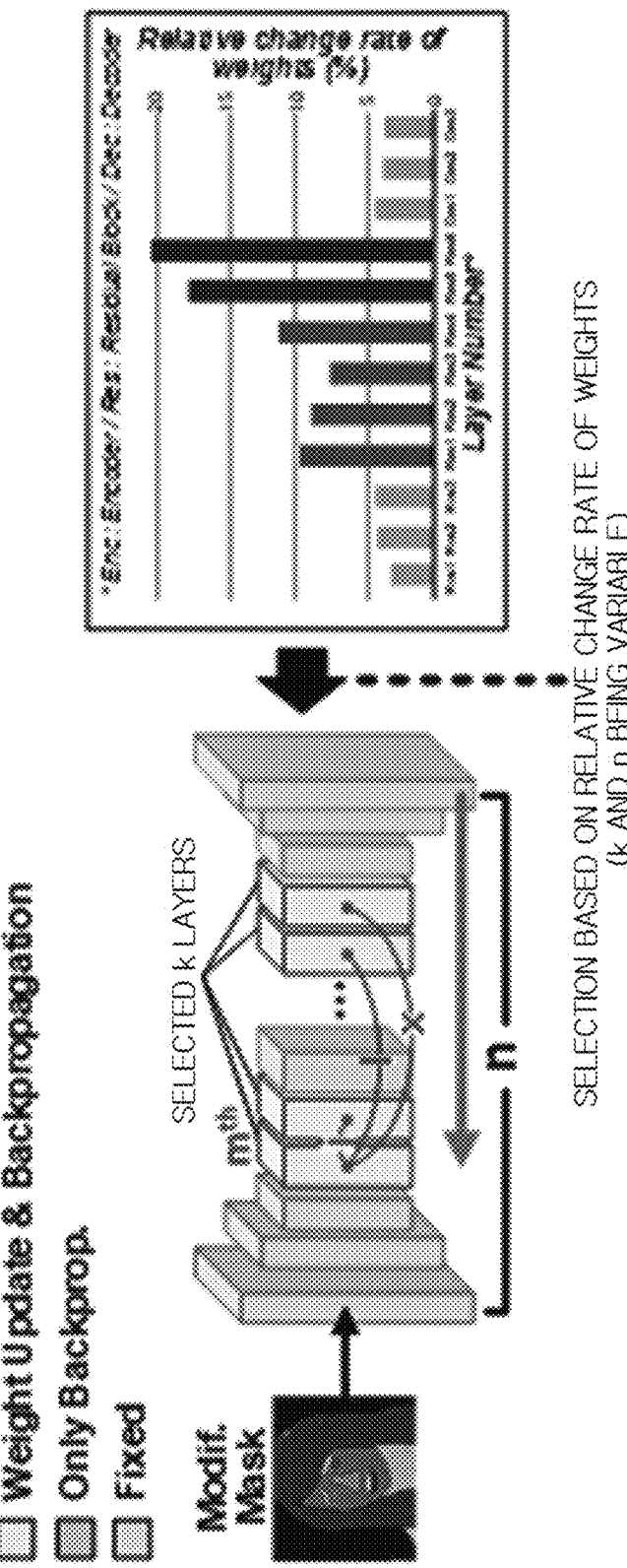

[FIG. 8]
Table I. A trade-off between the layer number and retraining performance*
| | Enc1 | Enc2 | Enc3 | Res1 | Res2 | Res3 | Res4 | Res5 | Res6 | Dec1 | Dec2 | Dec3 |
|---|---|---|---|---|---|---|---|---|---|---|---|---|
| PSNR | 18.414 | 19.911 | 22.833 | 25.959 | 27.322 | 28.08 | 29.311 | 30.395 | 30.963 | 22.455 | 17.96 | 15.67 |
| SSIM | 0.683 | 0.716 | 0.8 | 0.865 | 0.887 | 0.903 | 0.918 | 0.934 | 0.938 | 0.823 | 0.643 | 0.435 |
*100 epoch retraining
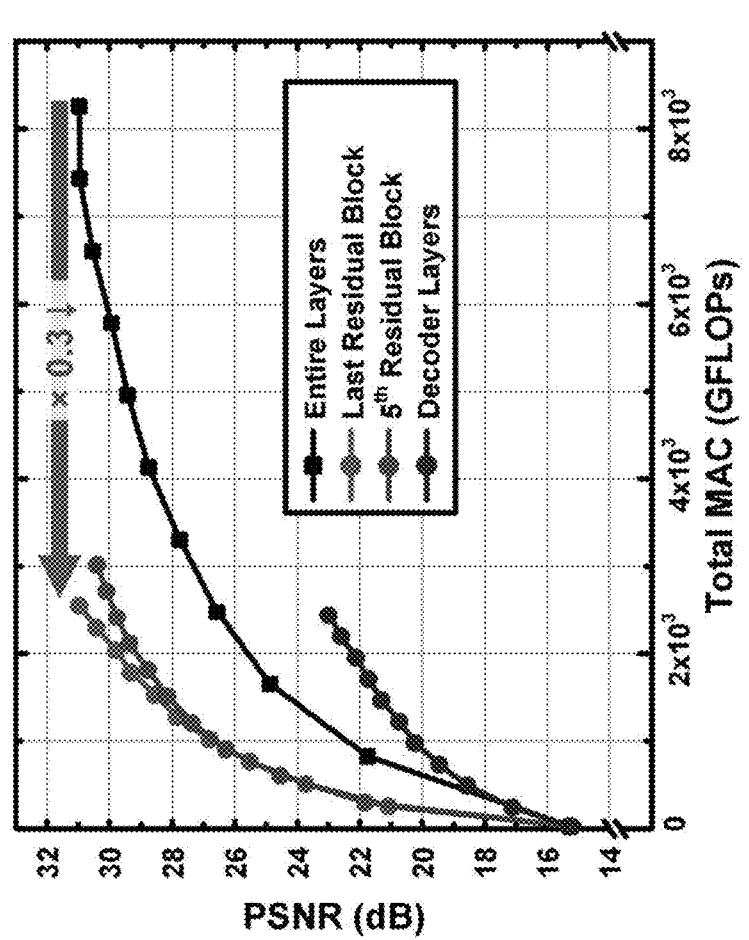

ENERGY-EFFICIENT RETRAINING METHOD OF GENERATIVE NEURAL NETWORK FOR DOMAIN-SPECIFIC OPTIMIZATION

BACKGROUND OF THE INVENTION

Field of the Invention

The present invention relates to an energy-efficient retraining method of a generative neural network for domain-specific optimization, and more particularly to an energy-efficient retraining method of a generative neural network for domain-specific optimization capable of selectively training only layers effective in improving quality of a retrained model, whereby it is possible to efficiently retrain the generative neural network without reduction in image quality.

Description of the Related Art

In recent years, artificial intelligence technology has been utilized in various application programs, such as object recognition and tracking, image synthesis, and image modification and restoration.

In particular, a generative neural network is capable of generating or regenerating a new image, unlike the existing artificial intelligence model, and thus is utilized in a variety of fields, such as style conversion, image synthesis, and image edit and restoration. In addition, the generative neural network generates a realistic high-quality image and thus provides a natural user experience in various application programs of a mobile device.

When a pretrained generative neural network is used at the time of inferring individual user data, however, there is a problem in that a distorted image is output due to effects of environment variables, such as specifications of a camera and lighting.

Consequently, retraining a pretrained model with individual user data for domain-specific optimization is very important.

However, a huge amount of operation is necessary for retraining due to complicated architecture and large functional map size of the generative neural network, and there is a problem in that the existing retraining scheme is not suitable for a mobile device in an environment in which speed and power consumption are limited.

In order for the mobile device to perform retraining for domain-specific optimization, therefore, there is a necessity for an efficient retraining method that guarantees high retraining performance while reducing burden of complex operation.

Of course, for the existing classification model mainly used for object recognition or object tracking, effective retraining methods of retraining only some parts in a limited environment, such as a mobile device, have been proposed. However, there is a problem in that such methods are not suitable for retraining of the generative neural network.

PRIOR ART DOCUMENT

Patent Document (Patent Document 1) Korean Registered Patent Publication No. 10-2139729 (2020.07.24)

SUMMARY OF THE INVENTION

The present invention has been made in view of the above problems, and it is an object of the present invention to provide an energy-efficient retraining method of a generative neural network for domain-specific optimization capable of selecting only some layers of a previously trained generative neural network, i.e. only layers that play a key role in improving retraining performance, at the time of retraining of the generative neural network, and retraining only the selected layers, whereby it is possible to greatly reduce operation burden while maintaining the existing performance.

It is another object of the present invention to provide an energy-efficient retraining method of a generative neural network for domain-specific optimization capable of using a new retraining scheme suitable for the generative neural network, whereby it is possible for a mobile device to retrain various application programs based on the generative neural network and thus to achieve domain-specific optimization.

In accordance with the present invention, the above and other objects can be accomplished by the provision of an energy-efficient retraining method of a generative neural network for domain-specific optimization, the energy-efficient retraining method including (a) retraining, by a mobile device, a pretrained generative neural network model with respect to some data of a new user dataset, (b) comparing, by the mobile device, the pretrained generative neural network model and a generative neural network model retrained for each layer with each other in terms of a relative change rate of weights, (c) selecting, by the mobile device, specific layers having high relative change rate of weights, among layers of the pretrained generative neural network model, as layers to be retrained, and (d) performing, by the mobile device, weight update for only the layers selected in step (c).

BRIEF DESCRIPTION OF THE DRAWINGS

The above and other objects, features and other advantages of the present invention will be more clearly understood from the following detailed description taken in conjunction with the accompanying drawings, in which:

FIG. 1 is a block diagram of an energy-efficient retraining mobile device of a generative neural network for domain-specific optimization according to the present invention and a view showing an example in which a generative neural network retraining method is applied to a real face modification program;

FIG. 2 is a view illustrating the necessity of an energy-efficient retraining method of a generative neural network for domain-specific optimization according to the present invention;

FIG. 3 is a view illustrating a problem that arises when a generative neural network is retrained in a limited environment, such as a mobile device;

FIG. 4 is a view illustrating a method of selecting a layer that is the most effective in performance improvement through retraining according to the present invention;

FIG. 5 is a flowchart of an energy-efficient retraining method of a generative neural network for domain-specific optimization according to the present invention;

FIG. 6 is a view illustrating an efficiency selective layer retraining process of the generative neural network in the energy-efficient retraining method of the generative neural network for domain-specific optimization according to the present invention;

FIG. 7 is a view illustrating layer selection in the energy-efficient retraining method of the generative neural network for domain-specific optimization according to the present invention; and FIG. 8 is a table and a graph showing retraining performance based on the layer number of a model in the energy-efficient retraining method of the generative neural network for domain-specific optimization according to the present invention.

DETAILED DESCRIPTION OF THE INVENTION

It should be understood that the terms or words used in the specification and appended claims should not be construed as being limited to general and dictionary meanings, but should be construed based on meanings and concepts according to the technical idea of the present invention on the basis of the principle that the inventor is permitted to define appropriate terms for the best explanation.

Accordingly, embodiments described in this specification and constructions shown in the drawings are merely the most preferred embodiment of the present invention and do not speak for the entirety of the technical idea of the present invention, and therefore it should be understood that various replaceable equivalents and modifications may be possible at the time of filing the present application.

Hereinafter, an energy-efficient retraining method of a generative neural network for domain-specific optimization according to the present invention will be described with reference to the accompanying drawings.

Before describing the energy-efficient retraining method of the generative neural network for domain-specific optimization according to the present invention, an energy-efficient retraining mobile device of the generative neural network for domain-specific optimization will be described in brief.

Figure 1:
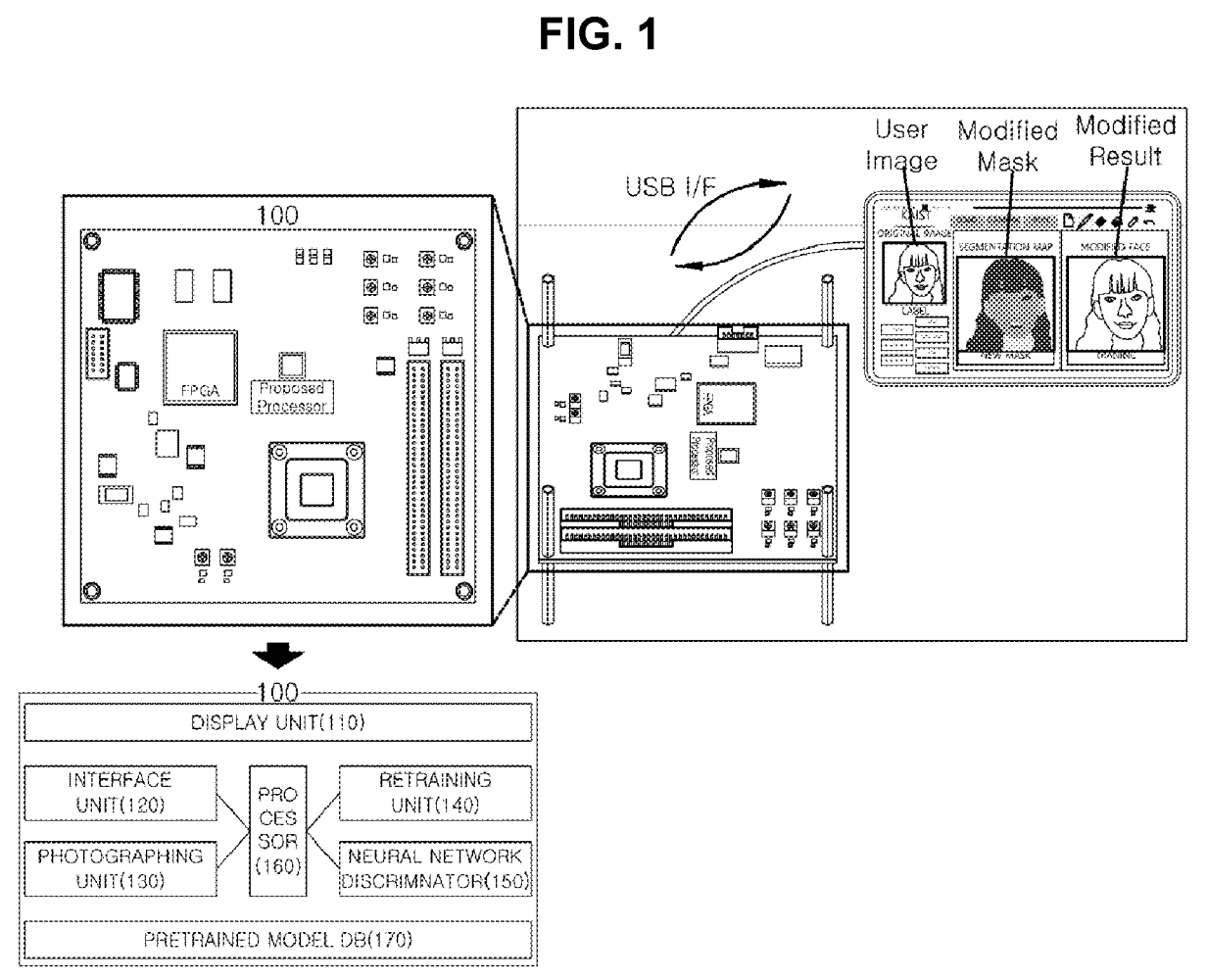

As shown in FIG. 1, the energy-efficient retraining mobile device 100 of the generative neural network for domain-specific optimization according to the present invention includes a display unit 110, an interface unit 120, a photographing unit 130, a retraining unit 140, a neural network discriminator 150, a processor 160, and a pretrained model DB 170.

The display unit 110 displays an image, such as a user image, a modified mask image, or a modified result. In addition, a user manipulation signal may be input to the display unit 110 by touch.

The interface unit 120 supports wired and wireless communication such that the mobile device can transmit and receive data to and from the outside.

The photographing unit 130 is mounted in the mobile device to photograph various things and to generate various kinds of image information therefrom.

The retraining unit 140 retrains a pretrained model with individual user data for domain-specific optimization.

At this time, the retraining unit 140 of the mobile device selects only some layers of the previously trained generative neural network, and retrains only the selected layers.

Through retraining described above, the retraining unit 140 may guarantee high retraining performance while reducing burden in complex operation for domain-specific optimization.

The present invention proposes a new retraining scheme suitable for the generative neural network, whereby the mobile device is capable of retraining various application programs based on the generative neural network and achieving domain-specific optimization therefrom.

The neural network discriminator 150 receives the result obtained from the generative neural network, converts quality of the result of the generative neural network into a score, and performs back propagation (or error propagation) using the score as a loss function.

The processor 160 supports a part necessary to perform the function of the retraining unit 140 or the neural network discriminator 150.

The pretrained model DB 170 stores and manages a pretrained generative neural network.

A retraining method by the energy-efficient retraining mobile device of the generative neural network for domain-specific optimization according to the present invention having the above construction will be described.

An energy-efficient retraining method of a generative neural network for domain-specific optimization according to the present invention is capable of removing training of unnecessary layers in a generative neural network retraining process, thereby reducing burden in operation, performing efficient retraining compared to a conventional method of retraining entire layers, and achieving domain-specific optimization of the generative neural network therefrom.

That is, the energy-efficient retraining method of the generative neural network for domain-specific optimization according to the present invention is capable of selectively training only the most effective layers in improving the quality of a retrained model, thereby efficiently retraining the generative neural network without reduction in image quality.

Despite excellent performance of the generative neural network, the pretrained generative neural network stored in the pretrained model DB 170 exhibits great reduction in performance with respect to new user data.

In other words, as shown in FIG. 2, distribution between training data used in the previous training process and new user data is changed due to environment variables, such as specifications of a camera, different races, and lighting conditions. As a result, performance of the generative neural network in a changed environment is not guaranteed.

In order to solve this problem and to be optimized with respect to a new domain, therefore, it is essential to retrain the pretrained generative neural network stored in the pretrained model DB 170, and it is possible to overcome reduction in performance due to various environment variables through retraining.

As shown in FIG. 3, however, there is a problem in that the mobile device 100 requires a huge amount of operation in order to retrain the generative neural network.

The mobile device 100 performs a three-stage training procedure including forward propagation (FP), error propagation (EP), and weight update (WU). As a result, an amount of operation equivalent to about 3 times existing inference is required.

In particular, there is a problem in that the mobile device 100 requires much more operation than for a classification model due to characteristics in that all generators maintain functional map resolution for the generative neural network.

In order to solve the above problem, the mobile device 100 selects randomly continuous layers or randomly discontinuous layers from among the layers of the pretrained generative neural network.

That is, the mobile device 100 may select and update k continuous layers from an m-th layer, which is an intermediate layer, in a retraining process, instead of retraining all layers, i.e. n layers, of the model.

At this time, the mobile device 100 may vary m, which is the position of the layer, and k, which is the number of layers, among the n layers, and may continuously or discontinuously (discretely) select and retrain the k layers from the m-th layer.

Meanwhile, when discontinuously (discretely) selecting the k layers, the mobile device 100 selects layers having relative change rates of weights before and after retraining exceeding a specific threshold value.

The mobile device 100 finds and selects layers that greatly affect performance improvement and retrains only the selected layers, thereby updating the selective continuous layers.

Since performance improvement through retraining is greatly changed depending on which layers are selected in partial retraining, therefore, a process of selecting layers to be updated before efficient retraining is very important.

Figure 5:
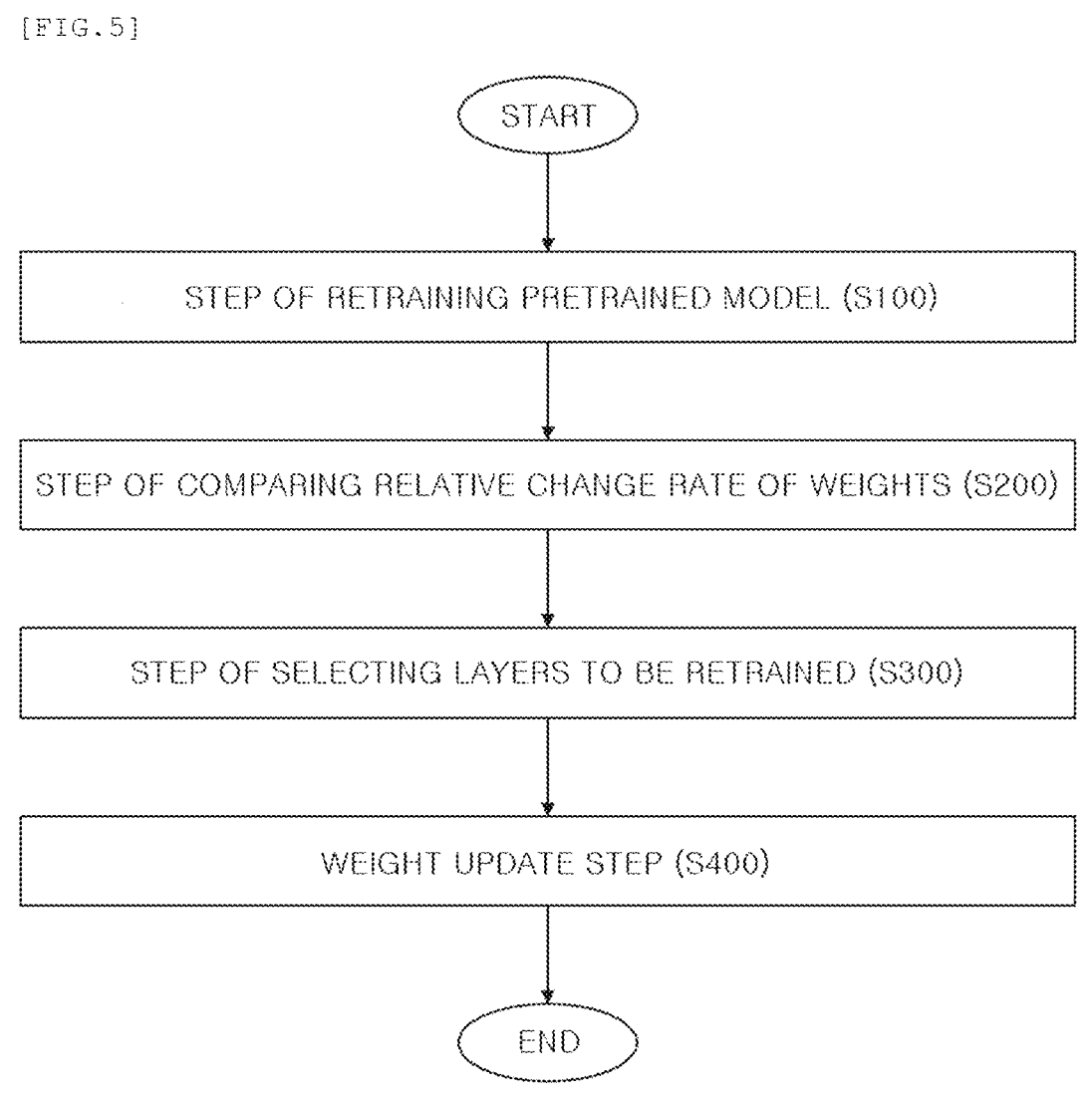

As shown in FIGS. 4 and 5, the mobile device 100 performs a step of retraining a model, pretrained with respect to a large training dataset, with respect to some data of a new user dataset (S100).

The weight of each layer of the generative neural network retrained in step S100 is changed so as to improve performance with respect to new user data.

In order to select layers effective in performance improvement through retraining, therefore, the mobile device 100 performs a step of comparing the pretrained model and a model retrained for each layer with each other in terms of a relative change rate of weights (S200).

That is, on the assumption that the pretrained model is A and an entire-layer retrained model for user-specific data is B, the mobile device 100 calculates a relative change rate from the weight of A for each layer to the weight of B.

At this time, the relative change rate of weights is a value obtained by dividing a difference between weights by the size of a pretrained weight, and the mobile device 100 performs a step of selecting specific layers having high relative change rate of weights as layers to be retrained (S300).

As an example, the last residual block layer, which is an intermediate layer, exhibits the greatest weight change with respect to MaskGAN, which is a kind of generative neural network, in a retraining process for domain-specific optimization.

In other words, this means that the final retraining performance is greatly affected, compared to other layers. Unlike a classification model exhibiting high performance improvement when the last several layers of the neural network are retrained, therefore, the last layer of the residual block, which is an intermediate layer between an encoder and a decoder, is retrained for a general generative adversarial network, which is effective in terms of the amount of operation and performance improvement.

FIG. 6 shows an efficiency selective layer retraining process of the generative neural network. The existing retraining method requires a forward propagation process, an error propagation process, and a weight update process for each of all layers.

As mentioned above, however, error propagation and weight update are not performed and original weights are maintained for layers that are located before the k continuous layers and that are not selected by the mobile device 100, i.e. a first layer, a second layer, . . . , and an (n-m)-th layer, excluding the k continuous layers selected by the mobile device 100, among the n layers. Forward propagation is performed in only a first epoch in the retraining step, and the forward propagation result of the first epoch is reused in repeated retraining epochs thereafter.

It is preferable for the mobile device 100 to perform forward propagation and error propagation without weight update for layers that are located after the continuously selected k layers from the m-th layer and that are not selected, among the n layers, and to perform the entire retraining process including forward propagation, error propagation, and weight update for only the selected k layers in order to update weights.

In contrast, the mobile device 100 maintains original weights without error propagation and weight update for continuous layers that are located before the first one of the discontinuously (discretely) selected k layers and that are not selected, among the n layers. Forward propagation is performed in only a first epoch in the retraining step, and the forward propagation result of the first epoch is reused in repeated retraining epochs thereafter.

In addition, the mobile device 100 performs the entire retaining process including forward propagation, error propagation, and weight update for only each of the discontinuously (discretely) selected layers, and performs forward propagation and error propagation without weight update for the layers that are located after the first one of the discretely selected layers.

The mobile device 100 inputs the result obtained from the generative neural network to a separate neural network discriminator, and the discriminator converts quality of the result of the generative neural network into a score and performs back propagation using the score as a loss function.

At this time, it is preferable for the mobile device 100 to set the loss function in order to generate a result in which distribution of generative data of a generative neural network to be trained approximates distribution of data at the time of initial training and to perform training.

In the above retraining process, the mobile device 100 trains a generative adversarial network, which is an example of the generative neural network, such that a separate neural network discriminator cannot discriminate the result of the generative neural network to be false through the generative neural network, and therefore a high-quality result approximating distribution of actual data is generated. For the discriminator, competitive training is performed so as to accurately discriminate whether the data are actual data or false data obtained through the generative neural network.

For reference, forward propagation is a process of calculating and storing variables from an input layer to an output layer of a neural network model in order, back propagation is a process of calculating an error between the neural network result and ground truth and performing propagation backwards to each layer (in order of an output layer to an input layer), and weight update is a process of calculating a weight gradient using the result of forward propagation and the result of back propagation to update weights.

In the retraining method according to the present invention, however, the mobile device 100 performs weight update for only the layers selected in step S300 (S400).

As a result, weights of most layers that are not selected by the mobile device 100 are maintained unchanged, whereby many parts of the existing retraining step may be omitted.

Back propagation and weight update are not necessary for layers before the selected layers indicated by gray in FIG. 6, i.e. layers before the last residual block layer.

For example, as shown in FIG. 7, the mobile device 100 according to the present invention selects only k specific layers, among a total of n layers of the generative neural network, and updates weights thereof, thereby improving performance while increasing training speed, and does not perform back propagation and weight update for layers before the last residual block layer.

In addition, for these layers, forward propagation is performed in only a first epoch in the retraining process, and the result may be reused in repeated epochs thereafter.

The output of each layer in the first epoch is stored in an external memory.

Subsequently, the mobile device 100 calls the output of the preceding layer that becomes the input of the layers selected in the repeated epochs of forward propagation from the external memory to an input memory in a chip so as to be reused.

As mentioned with reference to FIG. 7, layers after the selected layer indicated by blue in FIG. 6 require the forward propagation and the back propagation process whenever repeated. However, the weight update step is necessary for only the selected layer and is not necessary for the layers thereafter, whereby about ⅓ of the operation is removed, compared to the existing retraining process.

When selective layer retraining is applied to the last residual block in order to optimize MaskGAN, which is a kind of generative neural network, with respect to new user data, the best performance is achieved.

The table shown in FIG. 8 shows retraining performance based on the layer number of a generative neural network model. Peak signal-to-noise ratio (PSNR) and structural similarity index measure (SSIM) are criteria that are widely used in determining output quality of a generator in the generative neural network.

When retraining is performed for only the last residual block based on the proposed generative neural network retraining method according to the present invention, the best performance is achieved, compared to retraining of other layers.

Also, in the proposed efficient retraining method, the greatest reduction in amount of operation is achieved while the performance of the image generation results is maintained, compared to the existing method of retraining all layers.

The existing entire layer retraining method guarantees high PSNR (31 db); however, the required amount of operation (8.3 TFLOP) is too large, whereby the maximum PSNR is not achieved for the mobile device in a limited environment.

In contrast, the proposed retraining method according to the present invention may achieve the same level of PSNR as the existing method with reduction in amount of operation by 69.1%.

That is, the proposed retraining method according to the present invention trains only layers that have the greatest influence on performance change, whereby it is possible to greatly reduce the amount of operation. As a result, effective user adaptation, i.e. new domain optimization, is achieved without performance reduction through much less calculation than in the existing method.

FIG. 1 shows the result obtained by applying the generative neural network retraining method to an actual face modification program.

That is, the figure shows a mobile face edit/modification program that supports retraining for new user data in the general generative adversarial network for the mobile device 100 through application of the proposed efficient generative neural network retraining method, thereby supporting domain-specific optimization without performance reduction due to environment variables.

First, for the existing structure of MaskGAN used in the implemented face modification program, the size of the model is too large for the mobile device to perform inference and retraining, and therefore the weight thereof was reduced at the time of application program implementation.

In addition, when an Asian photograph or a user photograph taken using a tablet is used as the input of MaskGAN, a result image was distorted due to effects of various environment variables. Consequently, it is possible to effectively perform face modification for a new user photograph as well as the existing trained dataset by supporting the proposed retraining method according to the present invention that enables domain-specific optimization.

As is apparent from the above description, an energy-efficient retraining method of a generative neural network for domain-specific optimization according to the present invention has an effect in that only some of all layers are selected and trained in a retraining process that requires a large amount of operation, whereby rapid retraining is performed in a mobile device, which is a limited environment.

In addition, the energy-efficient retraining method of the generative neural network for domain-specific optimization according to the present invention has an effect in that a retraining scheme optimized for the generative neural network that retrains the last residual block layer, which is an intermediate layer, is applied, whereby effective user adaptation is achieved without performance reduction through much less calculation.

Although the technical idea of the present invention has been described above with reference to the accompanying drawings, this exemplarily explains preferred embodiments of the present invention but does not limit the present invention. In addition, it is obvious to a person having ordinary skill in the art to which the present invention pertains that various modifications and alterations are possible without departing from the category of the technical idea of the present invention.

What is claimed is:

1. An energy-efficient retraining method of a generative neural network for domain-specific optimization, the energy-efficient retraining method comprising:

retraining, by a mobile device, a pretrained generative neural network model with respect to some data of a new user dataset;

comparing, by the mobile device, the pretrained generative neural network model and a generative neural network model retrained for each layer with each other in terms of a relative change rate of weights;

selecting, by the mobile device, specific layers having high relative change rate of weights, among layers of the pretrained generative neural network model, as layers to be retrained; and performing, by the mobile device, weight update for only the layers selected in step (c), wherein the mobile device divides a difference between a weight of the pretrained generative neural network model and a weight of the retrained generative neural network model by a size of the weight of the pretrained generative neural network model in order to calculate the relative change rate of weights, wherein, in step (c), the mobile device selects k continuous or discontinuous layers from a random m-th layer, instead of retraining all n layers of the model, wherein, in step (d), the mobile device selects the k discontinuous layers by selecting layers having relative change rates of weights before and after retraining exceeding a specific threshold value, maintains original weights without error propagation and weight update for continuous layers that are located before a first one of the discontinuously selected layers and that are not selected, performs forward propagation in only a first epoch of a retraining step, and reuses a result of the forward propagation of the first epoch in repeated retraining epochs thereafter, wherein the mobile device performs forward propagation, error propagation, and weight update for only each of the discretely selected layers, and performs forward propagation and error propagation without weight update for layers that are located after a first one of the discretely selected layers.

2. An energy-efficient retraining method of a generative neural network for domain-specific optimization, the energy-efficient retraining method comprising:

retraining, by a mobile device, a pretrained generative neural network model with respect to some data of a new user dataset;

comparing, by the mobile device, the pretrained generative neural network model and a generative neural network model retrained for each layer with each other in terms of a relative change rate of weights;

selecting, by the mobile device, specific layers having high relative change rate of weights, among layers of the pretrained generative neural network model, as layers to be retrained; and performing, by the mobile device, weight update for only the layers selected in step (c), wherein the mobile device divides a difference between a weight of the pretrained generative neural network model and a weight of the retrained generative neural network model by a size of the weight of the pretrained generative neural network model in order to calculate the relative change rate of weights, wherein, in step (c), the mobile device selects k continuous or discontinuous layers from a random m-th layer, instead of retraining all n layers of the model, wherein, in step (d), the mobile device maintains original weights without weight update for unselected layers, after selecting the k continuous layers, does not perform even back propagation for unselected layers before a first one of the selected layers, performs forward propagation in only a first epoch of retraining, and reuses a result of the forward propagation of the first epoch in repeated retraining epochs thereafter, wherein the mobile device receives a result obtained from the generative neural network, converts quality of the result of the generative neural network into a score, and performs the error propagation using the score as a loss function, wherein the mobile device sets the loss function in order to generate a result in which distribution of generative data of a generative neural network to be trained approximates distribution of data at a time of initial training, and performs training.

3. The energy-efficient retraining method according to claim 1, wherein the mobile device receives a result obtained from the generative neural network, converts quality of the result of the generative neural network into a score, and performs the error propagation using the score as a loss function.

4. An energy-efficient retraining method of a generative neural network for domain-specific optimization, the energy-efficient retraining method comprising:

retraining, by a mobile device, a pretrained generative neural network model with respect to some data of a new user dataset;

comparing, by the mobile device, the pretrained generative neural network model and a generative neural network model retrained for each layer with each other in terms of a relative change rate of weights;

selecting, by the mobile device, specific layers having high relative change rate of weights, among layers of the pretrained generative neural network model, as layers to be retrained; and performing, by the mobile device, weight update for only the layers selected in step (c), wherein the mobile device divides a difference between a weight of the pretrained generative neural network model and a weight of the retrained generative neural network model by a size of the weight of the pretrained generative neural network model in order to calculate the relative change rate of weights, wherein, in step (c), the mobile device selects k continuous or discontinuous layers from a random m-th layer, instead of retraining all n layers of the model, wherein, in step (d), the mobile device selects the k discontinuous layers by selecting layers having relative change rates of weights before and after retraining exceeding a specific threshold value, maintains original weights without error propagation and weight update for continuous layers that are located before a first one of the discontinuously selected layers and that are not selected, performs forward propagation in only a first epoch of a retraining step, and reuses a result of the forward propagation of the first epoch in repeated retraining epochs thereafter, wherein the mobile device performs forward propagation, error propagation, and weight update for only each of the discretely selected layers, and performs forward propagation and error propagation without weight update for layers that are located after a first one of the discretely selected layers, wherein the mobile device receives a result obtained from the generative neural network, converts quality of the result of the generative neural network into a score, and performs the error propagation using the score as a loss function.

* * * * *